United States Patent
Sugama et al.

(10) Patent No.: US 7,293,838 B2
(45) Date of Patent: Nov. 13, 2007

(54) SEAT FOR VEHICLE

(75) Inventors: Takahiro Sugama, Nishikamo-gun (JP); Makoto Esaki, Toyota (JP); Takashi Mukoujima, Toyota (JP)

(73) Assignees: Toyota Shatai Kabushiki Kaisha, Kariya (JP); Toyota Boshoku Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/336,988

(22) Filed: Jan. 23, 2006

(65) Prior Publication Data

US 2006/0181133 A1    Aug. 17, 2006

(30) Foreign Application Priority Data

Feb. 14, 2005 (JP) ............................ 2005-035410

(51) Int. Cl.
B60N 2/02 (2006.01)
(52) U.S. Cl. .............. 297/378.1; 297/341; 297/378.14; 297/335; 297/331; 296/65.09
(58) Field of Classification Search ................ 297/367, 297/378.12, 341, 378.14, 331, 335; 296/65.05, 296/65.09
See application file for complete search history.

(56) References Cited

U.S. PATENT DOCUMENTS 3,953,069 A * 4/1976 Tamura et al. ............... 297/367
3,958,828 A * 5/1976 Ishida et al. ............. 297/361.1
5,158,338 A * 10/1992 Hayakawa et al. ......... 297/335
5,529,378 A * 6/1996 Chaban et al. .............. 297/331
5,788,330 A * 8/1998 Ryan ..................... 297/378.12
5,800,015 A * 9/1998 Tsuchiya et al. ............ 297/331
6,152,533 A * 11/2000 Smuk .......................... 297/341
6,739,668 B2 * 5/2004 Coman et al. ......... 297/378.12
7,137,667 B2 * 11/2006 Habedank .............. 297/378.12

FOREIGN PATENT DOCUMENTS

| JP | A 11-348622 | 12/1999 |
|---|---|---|
| JP | A 2000-004971 | 1/2000 |
| JP | A 2003-285674 | 10/2003 |
| JP | A 2004-050868 | 2/2004 |

* cited by examiner

Primary Examiner—David Dunn
Assistant Examiner—Erika Garrett
(74) Attorney, Agent, or Firm—Oliff & Berridge, PLC

(57) ABSTRACT

A seat for a vehicle has an upper panel provided integrally with a seat back which can be tilted forward and rearward by operating an operation lever for reclining use. At a first operation position of an operation lever for walk-in use, the operation lever for walk-in use is interlocked with the operation lever for reclining use through a linking arm to tilt the upper panel urged by a spring forward. A projected piece mounted on the upper panel contacts a slide-unlocking lever and operates the slide-unlocking lever to rotate in an unlocking direction. Thereby slide locking of the seat for the vehicle is released. At a second operation position of the operation lever for walk-in use, the slide-unlocking lever is operated directly by a linking plate. Thereby the slide locking of the seat for the vehicle is released.

5 Claims, 5 Drawing Sheets

SEAT FOR VEHICLE

BACKGROUND OF THE INVENTION

1. Field of the Invention

The present invention relates to a seat for a vehicle and more particularly to a seat for a vehicle having a walk-in mechanism provided for a person getting on a rear seat.

2. Description of the Related Art

As shown in FIG. 5, many types of walk-in mechanisms mounted on a seat of a vehicle have a walk-in lever 8 projected rearward from a lower end of a seat back S1. The walk-in lever 8 is interlocked with a reclining mechanism of the seat back S1. When the walk-in lever 8 is pressed down, the reclining mechanism is unlocked. Thereby the seat back S1 is tilted forward by an urging force as shown with a two-dot chain line of FIG. 5. When the seat back S1 is tilted forward, a part of the seat back S1 contacts a slide-unlocking lever (not shown in FIG. 5). Thereby the seat back S1 can be slid forward.

FIG. 6 shows a known tip-up type seat for sufficiently securing a baggage room in a rear part of a vehicle. The tip-up type seat can be moved forward, with a seat cushion S2 tipped up toward the seat back S1. Even though the conventional walk-in mechanism is used in the tip-up type seat, the seat back S1 cannot be tilted forward because the seat cushion S2 tipped up interferes with the seat back S1. Thereby a slide mechanism cannot be unlocked. Such being the case, as shown in FIG. 6, an operation lever 9 is projected rearward from a lower end of the seat back S1, with the operation lever 9 spaced at a certain interval from the walk-in lever 8. The slide mechanism can be unlocked by pressing down the operation lever 9. But it is necessary to mount the two levers 8, 9 on the lower end of the seat back S1. Thus this construction is disadvantageous in terms of the cost and the space required for mounting the two levers 8, 9.

In the walk-in mechanism is proposed and disclosed in Japanese Patent Application Laid-Open No. 2000-4971 to solve the above-described problem, by using a wire, a reclining release lever and a slide-unlocking lever are connected to a pulling operation type single wire provide data lower portion of the seat back. Thereby the seat back can be reclined and the seat can be slid by the single operation lever.

In the above-described walk-in mechanism, the seat can be slid by operating the single operation lever regardless of whether or not the seat back cannot be tilted forward because the seat cushion of the tip-up seat is tipped up. But the walk-in mechanism has a problem that it is necessary to keep pulling the operation lever in a normal walk-in operation which is performed to tilt the seat back forward. Therefore the walk-in mechanism has a low degree of operability.

SUMMARY OF THE INVENTION

The present invention has been made to solve the above-described problems. Therefore it is an object of the present invention to provide a seat for a vehicle having a walk-in mechanism which is excellent in operability because it is unnecessary to keep operating an operation member for walk-in use and which allows the seat to be slid by operating the above-described operation member for walk-in use, when a seat cushion is tipped up so that a seat-mounting space is small and the seat can be manufactured at a low cost.

To solve the above-described problems, the first invention provides a seat for a vehicle, including a seat back; an operation member for reclining use capable of tilting the seat back forward and rearward; an operation member for walk-in use which can be operated to be moved from an original position to a first operation position and to a second operation position; a slide-unlocking member for releasing slide locking of the seat for the vehicle; a first interlocking mechanism for operating the slide-unlocking member in an unlocking direction by means of the seat back, urged by a spring, which has been tilted forward by interlocking the operation member for reclining use with the operation member for walk-in use when the operation member for walk-in use is operated to be disposed at the first operation position; and a second interlocking mechanism for releasing the slide locking of the seat for the vehicle by interlocking the slide-unlocking member with the operation member for walk-in use, when the operation member for walk-in use is operated to be disposed at the second operation position.

In the first invention, when the operation member for walk-in use is operated to be disposed at the first operation position in an ordinary use state, namely, in a state in which the seat cushion is not tipped up, the operation member for walk-in use is interlocked with the operation member for reclining use by the first interlocking mechanism. As a result, the seat back is rotated in the forward tilted direction by the urging force of the spring. During the rotation of the seat back, the slide-unlocking member is operated in the unlocking direction. Consequently the locking of the seat is released. Thereby by moving the seat forward, it is possible to secure a sufficiently large get-on and get-off space between the seat and a rear seat. In this case, because the seat back maintains the forward tilted state, the slide-unlocking member remains operated in the unlocking direction. Thus it is unnecessary to keep operating the operation member for walk-in use. When the seat cushion is tipped up toward the seat back to increase a baggage room disposed in the rear part of the vehicle, the tipped up seat cushion interferes with the rotation of the seat back in the forward tilted direction, even though the operation member for walk-in use is operated to dispose it at the first operation position. In this case, the operation member for walk-in use is operated to dispose it at the second operation position. As a result, the operation member for walk-in use is inter locked with the slide-unlocking member by the second interlocking mechanism. Thereby the slide locking of the seat for the vehicle is released.

In the second invention, the first interlocking mechanism has a coupling member provided between the operation member for walk-in use and the operation member for reclining use. The coupling member is coupled to the operation member for reclining use, when the operation member for walk-in use is operated, whereas the coupling member is uncoupled from the operation member for walk-in use, when the operation member for reclining use is operated.

In the second invention, when a person seated on the seat cushion operates the operation member for reclining use in the ordinary use state, namely, in the state in which the seat cushion is not tipped up, the seat back can be reclined, but the coupling member is uncoupled from the operation member for walk-in use by the first interlocking mechanism. Therefore the slide locking of the seat for the vehicle is not released.

As described above, the seat for a vehicle of the present invention is excellent in operability because it is unnecessary to keep operating the operation member for walk-in use in the ordinary walk-in operation. Further the seat can be slid by operating the above-described operation member for walk-in use, when the seat cushion is tipped up. Thereby the seat for a vehicle of the present invention can be manufactured at a lower cost and in a smaller mounting space than the conventional seat for a vehicle having the operation lever separate from the walk-in lever.

DETAILED DESCRIPTION OF THE PREFERRED EMBODIMENTS

Figure 1:
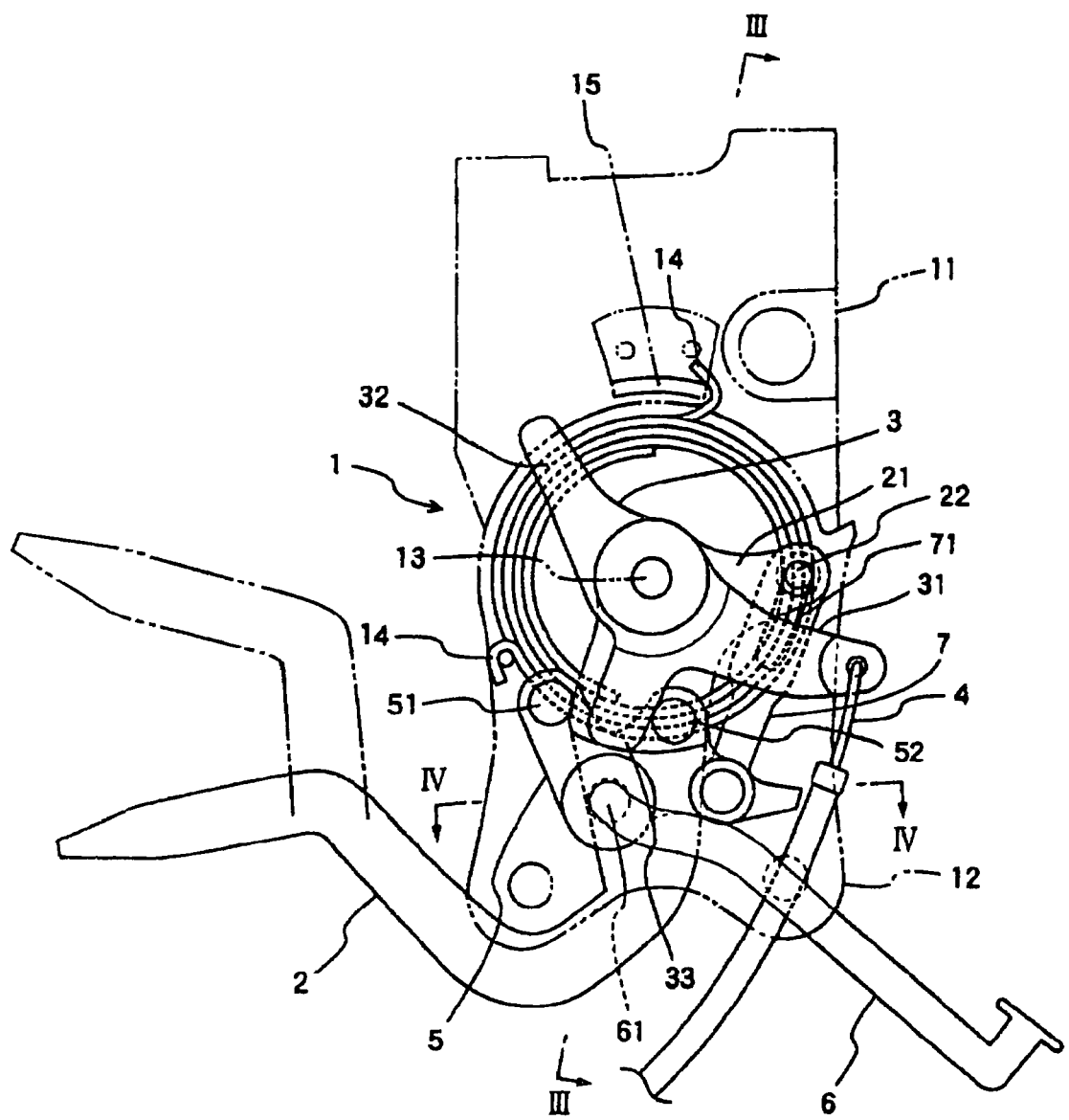
FIG. 1 is a side view seen from the inside of a mechanism of reclining a seat back of a seat for a vehicle provided with a walk-in mechanism.
Figure 2:
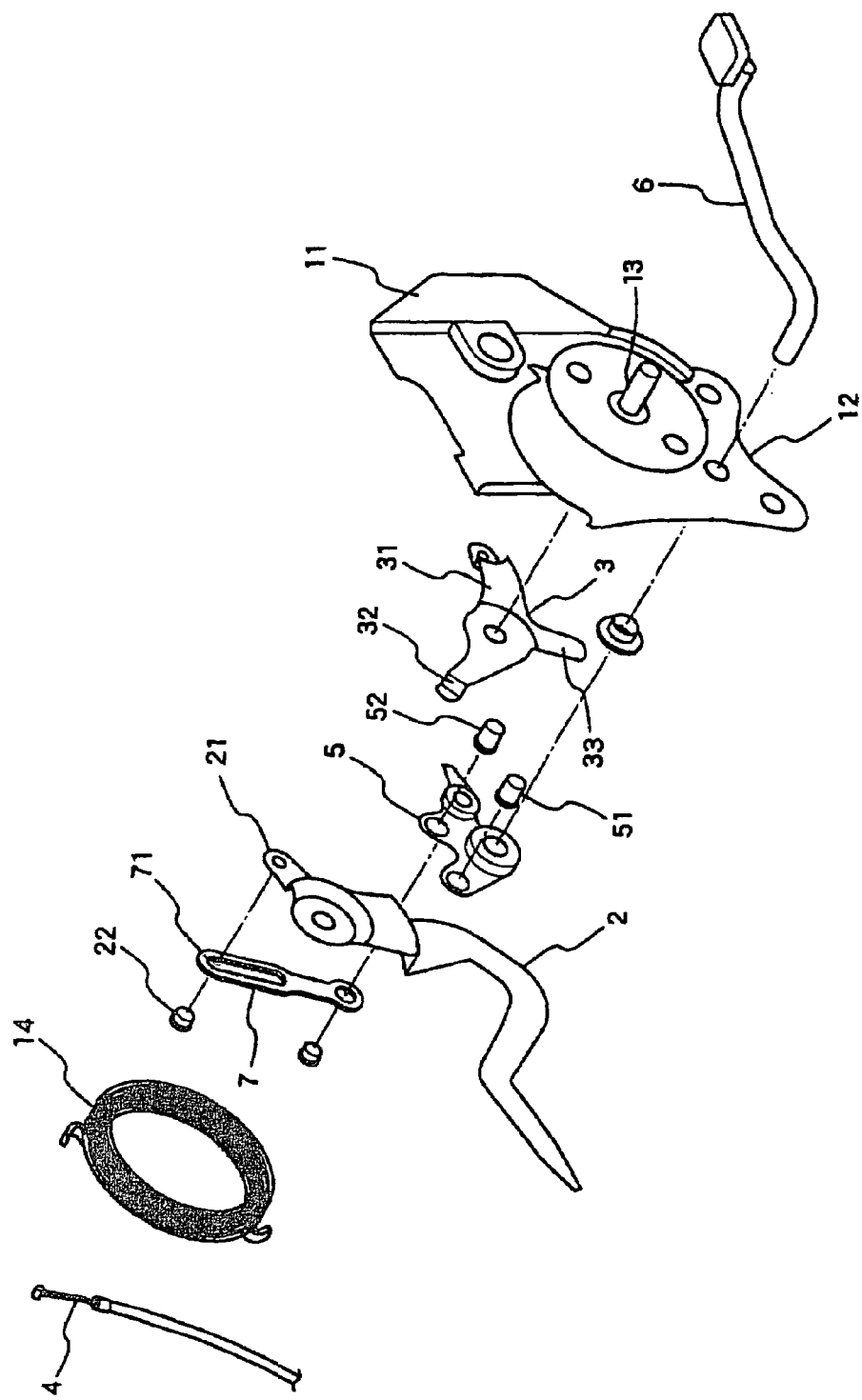
FIG. 2 is an exploded perspective view of the reclining mechanism seen from the inside thereof.
Figure 3:
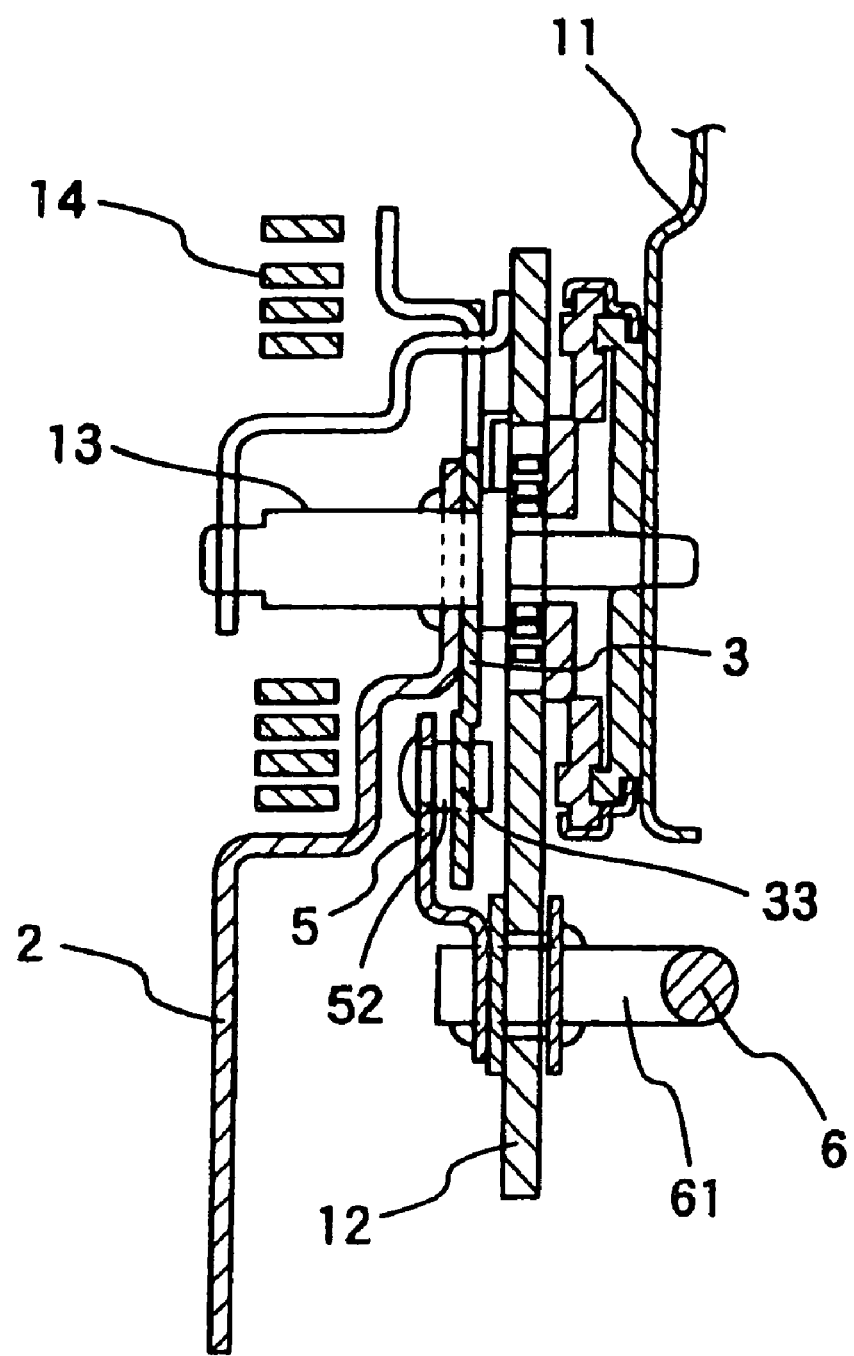
FIG. 3 is a sectional view taken along a line III-III of FIG. 1.
Figure 4:
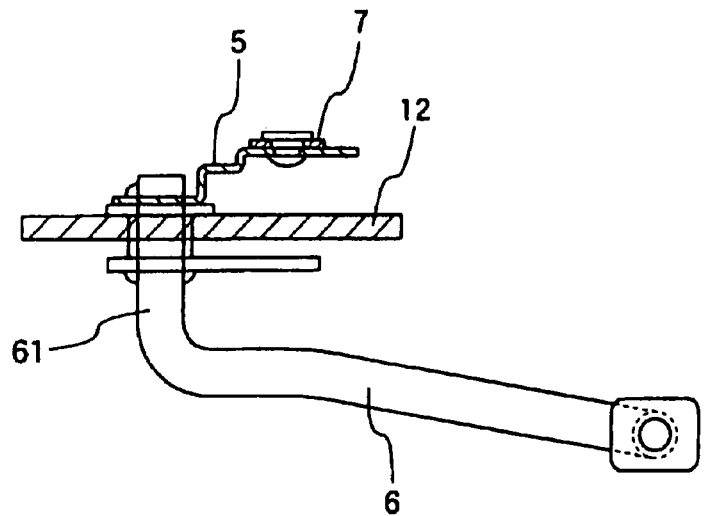
FIG. 4 is a sectional view taken along a line IV-IV of FIG. 1.
Figure 5:
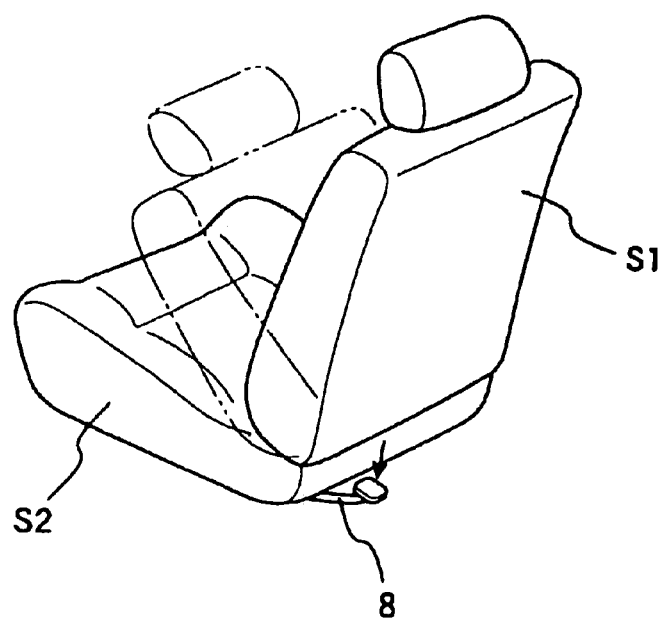
FIG. 5 is a perspective view showing a conventional seat for a vehicle viewed from a rear side thereof.
Figure 6:
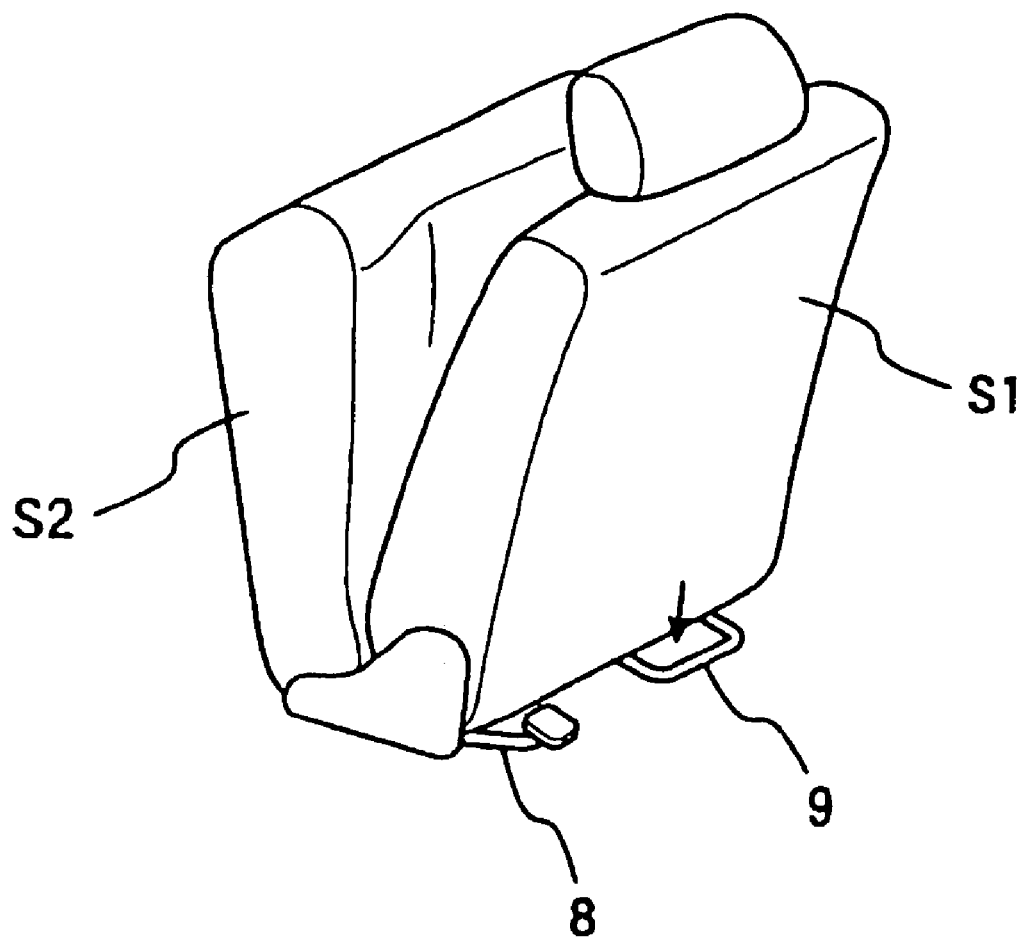
FIG. 6 is a perspective view showing another conventional seat for a vehicle viewed from a rear side thereof.

FIG. 1 is a side view seen from the inside of a mechanism of reclining a seat back of a seat for a vehicle provided with a walk-in mechanism. FIG. 2 is an exploded perspective view of the reclining mechanism seen from the inside thereof. FIG. 3 is a sectional view taken along a line III-III of FIG. 1. FIG. 4 is a sectional view taken along a line IV-IV of FIG. 1.

A reclining mechanism 1 has an upper panel 11 fixed to a lower-end portion of a side surface of a seat back and a lower panel 12 fixed to an upper rail of a slide rail. The upper panel 11 and the lower panel 12 are coupled to each other by means of a shaft 13. The upper panel 11 is rotatable relative to the lower panel 12. A spring 14 is mounted on the periphery of the shaft 13, with one end of the spring 14 locked to the upper panel 11 and with the other end thereof locked to the lower panel 12. The upper panel 11 is urged counterclockwise in FIG. 1 by the force of the spring 14. Thereby the seat back is urged in a forward tilted direction.

An operation lever 2 for reclining use (hereinafter often referred to as operation lever 2) is extended forward (left-hand side in FIG. 1) from the seat. The operation lever 2 can be rotated about the shaft 13. When a front end of the operation lever 2 is pulled upward as shown with a two-dot chain line of FIG. 1, the locked rotation of the upper panel 11 relative to the lower panel 12 is released by a known mechanism. Thereby the seat back can be reclined. In this case, a spring of another type can be used as the spring 14.

A slide-unlocking lever 3 is mounted on the shaft 13. The slide-unlocking lever 3 is rotatable relative to the shaft 13. The slide-unlocking lever 3 is a plate member and has legs 31, 32, and 33 projected outward from the shaft 13 at three positions in the circumferential direction thereof. One end of an operation wire 4 extended to a slide-locking mechanism is connected to the leg 31. When the lever 3 rotates counterclockwise and thereby the operation wire 4 is pulled, the slide-locking mechanism is released. The leg 32 projects upward beyond an upper edge of the lower panel 12 to be located in a moving locus of a projected piece 15 provided on the upper panel 11 the seat back, when the seat back tilts forward. The leg 33 is located proximately to the linking plate 5 that is described below.

The linking plate 5 is approximately fan-shaped. A central portion of the linking plate 5 is fixed to a proximal portion of a shaft of an operation lever 6 for walk-in use (hereinafter often referred to as operation lever 6) extending obliquely rearward and downward beyond the lower panel 12. More specifically, with reference to FIG. 4, a proximal portion 61 of the operation lever 6 bends at a certain position of the operation lever 6 toward the lower panel 12 and rotatably penetrates through the lower panel 12. The central portion of the linking plate 5 is fitted on the periphery of the proximal portion 61 of the operation lever 6. Pins 51, 52 are mounted on the periphery of the linking plate 5. The leg 33 of the slide-unlocking lever 3 is disposed between the pins 51 and 52. One end of a linking arm 7 is rotatably coupled to an end of the periphery of the linking plate 5. A slot 71 having a certain length is formed longitudinally on the other end of the linking arm 7. A pin 22 provided on a projection 21 of a proximal portion of the operation lever 2 is movably fitted in the slot 71, with the pin 22 located at an upper end of the slot 71.

In the seat having the above-described construction, when the operation lever 6 is pressed down (first operation position) in an ordinary use state, namely, in a state in which the seat cushion is not tipped up, the linking plate 5 fixed to the operation lever 6 rotates clockwise in FIG. 1 about the proximal portion 61 of the shaft of the operation lever 6. As a result, the operation lever 2 is rotated clockwise through the linking arm 7. Thereby the locked rotation of the upper panel 11 relative to the lower panel 12 is released. As a result, the upper panel 11 is rotated on the shaft 13 counterclockwise in FIG. 1, namely, in the forward tilted direction by the urging force of the spring 14. During the rotation of the upper panel 11, the projected piece 15 of the upper panel 11 contacts the leg 32 of the slide-unlocking lever 3. Thereby the slide-unlocking lever 3 is rotated about the shaft 13 counterclockwise in FIG. 1. Consequently the operation wire 4 is pulled upward, and the slide-locking mechanism is released. Thereby by moving the seat forward, it is possible to secure a sufficiently large get-on and get-off space between the seat and a rear seat.

In this case, because the seat back maintains the forward tilted state, the operation wire 4 remains pulled. Thus it is unnecessary to keep pressing down the operation lever 6. In addition, in this embodiment, owing to the counterclockwise rotation of the slide-unlocking lever 3, the leg 33 thereof contacts the pin 52. Thereby the operation lever 6 remains at low position. Because the operation lever 6 does not obstruct the way, it is easy for a person to get on and off the rear seat.

When the seat cushion is tipped up toward the seat back to increase a baggage room disposed in the rear part of the vehicle, the tipped up seat cushion prevents the rotation of the seat back, namely, the upper panel 11 in the forward tilted direction, even though the operation lever 2 is rotated clockwise in FIG. 1 by pressing down the operation lever 6. Thus in this case, when the operation lever 6 is further pressed down (second operation position), the pin 51 of the linking plate 5 contacts the leg 33 of the slide-unlocking lever 3, thus rotating the slide-unlocking lever 3 counterclockwise in FIG. 1 about the shaft 13. Consequently the operation wire 4 is pulled. Thereby the slide-locking mechanism is released. Thereby the seat can be moved forward in a large amount.

When a person seated on the seat cushion pulls up the operation lever 2 in the ordinary use state, namely, in the state in which the seat cushion is not tipped up, the locked rotation of the upper panel 11 relative to the lower panel 12 is released. Consequently the seat back can be reclined. At this time, the pin 22 moves downward inside the slot 71. So, the linking arm 7 and the linking plate 5 coupled thereto cannot be operated. Therefore the slide locking is not released.

In the above-described embodiment, the second operation position of the operation lever 6 may be set at the same position as the first operation position. As the construction of not actuating the linking plate 5, namely, the operation lever 6 when the operation lever 2 is operated, a construction other than that of the linking arm 7 and that of the slot 71 may be adopted.

What is claimed is:

1. A seat for a vehicle, comprising:
   a seat back;
   a seat cushion capable of being tipped up toward said seat back, said seat back and said seat cushion being connected through a reclining mechanism;
   a first operation member for reclining use capable of tilting said seat back forward and rearward;
   a second operation member for walk-in use which can be operated to be moved from an original position to a first operation position and to a second operation position;
   a slide-unlocking member for releasing slide locking of said seat for said vehicle;
   a first interlocking mechanism for operating said slide-unlocking member in an unlocking direction by means of said seat back, urged by an urging member, which has been tilted forward by interlocking said first operation member with said second operation member when said second operation member is operated to be disposed at said first operation position; and
   a second interlocking mechanism for releasing said slide locking of said seat for said vehicle by interlocking said slide-unlocking member with said second operation member, when said second operation member is operated to be disposed at said second operation position; whereby said seat can be slid by operating the second operation member even when said seat back cannot be tilted forward because said seat cushion is in a tipped-up position.

2. A seat for a vehicle according to claim 1, wherein said reclining mechanism comprises an upper panel, a part of said upper panel is fixed to a lower-end portion of a side surface of said seat back and contacts said slide-unlocking member when said seat back tilts forward, thus serving as a means for operating said slide-unlocking member in an unlocking direction.

3. A seat for a vehicle according to claim 1, wherein said slide-unlocking member operated in said unlocking direction by said seat back contacts said second operation member, thus moving said second operation member to said second operation position located below said first operation position.

4. A seat for a vehicle according to claim 1, wherein said first interlocking mechanism has a coupling member provided between said second operation member and said first operation member; and said coupling member is coupled to said first operation member, when said second operation member is operated, and said coupling member is uncoupled from said second operation member, when said first operation member is operated.

5. A seat for a vehicle according to claim 4, wherein a slot is formed on said coupling member; when said second operation member is operated, a pin formed on said first operation member contacts an end of said slot, whereby said coupling member is interlocked with said first operation member, and when said first operation member is operated, said pin moves along said slot, whereby said coupling member is substantially uncoupled from said second operation member.

* * * * *